Figure 1:
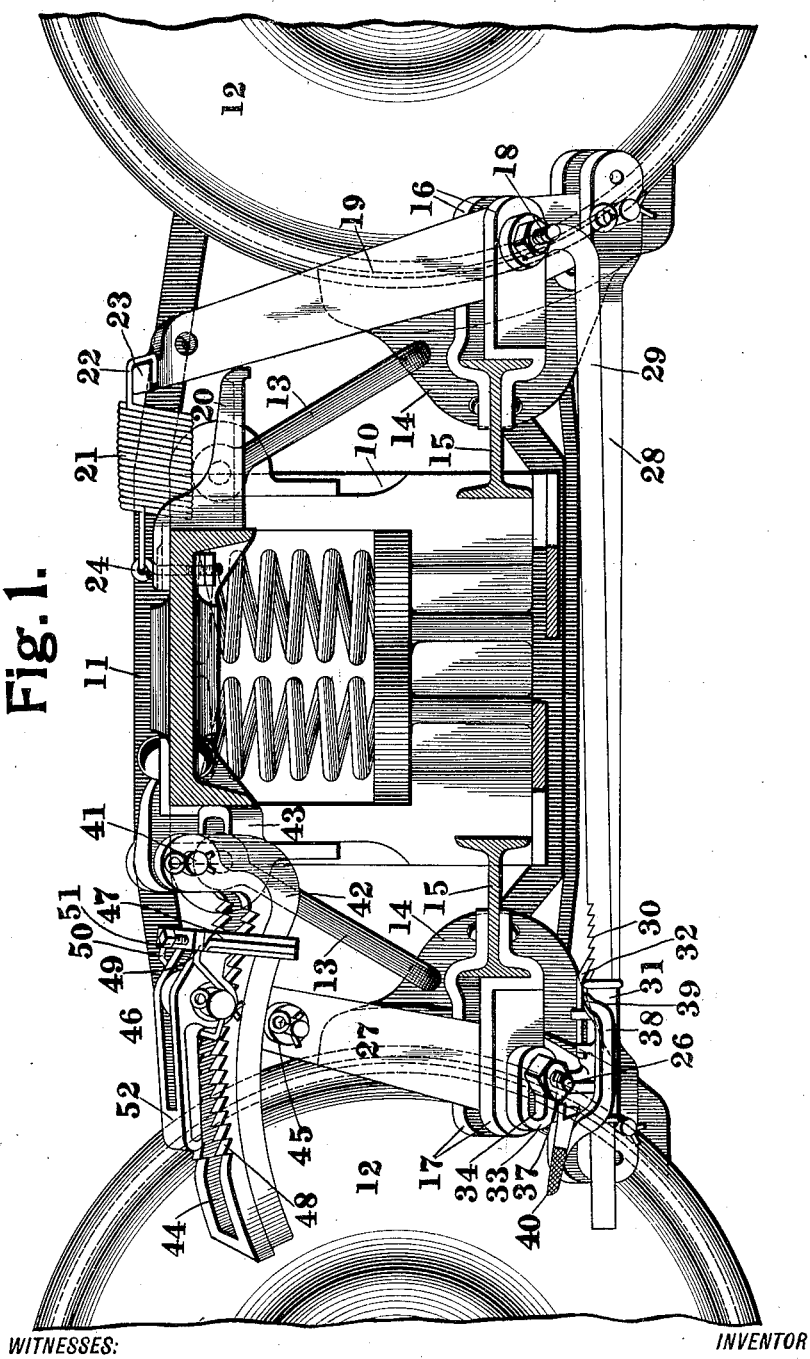

L. A. HOERR.
SLACK ADJUSTER.
APPLICATION FILED DEC. 11, 1912.

1,092,215.

Patented Apr. 7, 1914.
2 SHEETS—SHEET 1.

WITNESSES:
Chas. A. Becker.
W. A. Alexander.

INVENTOR
Louis A. Hoerr,
BY
E. E. Huffman
ATTORNEY

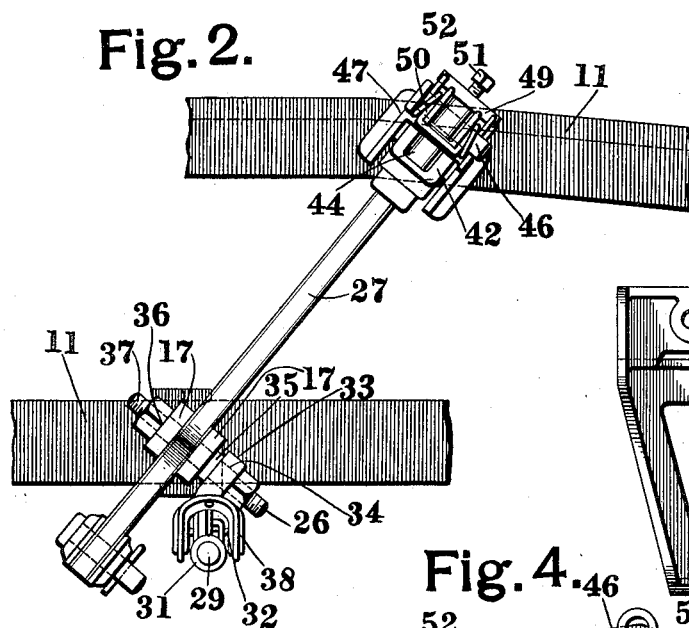
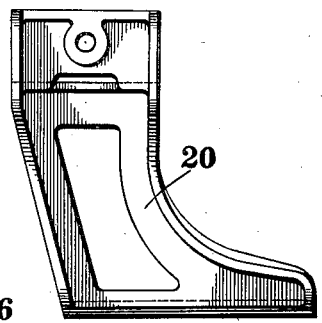
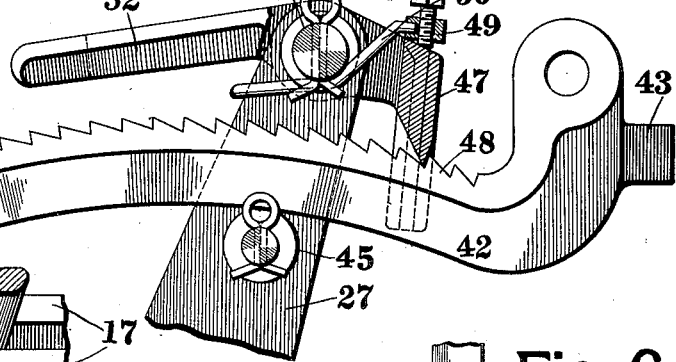
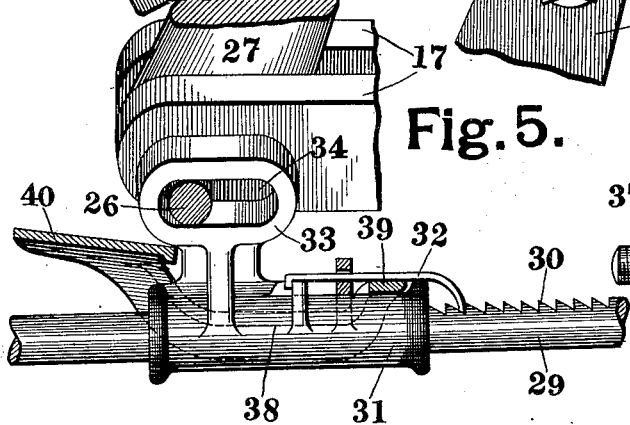
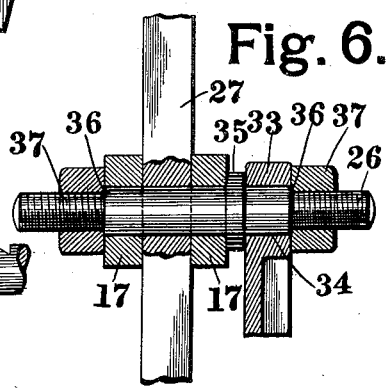

UNITED STATES PATENT OFFICE.

LOUIS A. HOERR, OF ST. LOUIS, MISSOURI.

SLACK-ADJUSTER.

1,092,215.

Specification of Letters Patent.

Patented Apr. 7, 1914.

Application filed December 11, 1912. Serial No. 736,086.

*To all whom it may concern:*

Be it known that I, LOUIS A. HOERR, a citizen of the United States of America, residing at the city of St. Louis, State of Missouri, have invented a certain new and useful Slack-Adjuster, of which the following is such a full, clear, and exact description as will enable any one skilled in the art to which it appertains to make and use the same, reference being had to the accompanying drawings, forming part of this specification.

My invention relates to slack adjusters for car brakes and more particularly to that form of slack adjuster shown and described in Patent No. 718,799 to W. H. Sauvage, issued January 20, 1903.

My invention consists of various novel features and details of construction, all of which will be described in the following specification and pointed out in the claims affixed thereto.

In the accompanying drawings, which illustrate one form of slack adjuster made in accordance with my invention, together with a portion of a car brake to which same is applied, Figure 1 is a vertical central section; Fig. 2 is an end view of the dead lever and parts attached thereto; Fig. 3 is an enlarged top plan view of the stop for the live lever; Fig. 4 is an enlarged detail view partly in section, showing the upper end of the dead lever ratchet bar; and Figs. 5 and 6 are enlarged detail views showing the connection of the adjustable bar with the dead lever.

Like marks of reference refer to similar parts in the several views of the drawings.

10 represents the truck end frame carrying the bolster 11 and wheels 12. Suspended from the end frame 10 by links 13 are brake shoes 14 connected in pairs by the brake beams 15. All of the above parts may be of any usual and well-known construction.

Carried by one of the brake beams 15 is a pair of inclined lugs 16, and by the other, a similar pair of inclined lugs 17. Pivoted between the lugs 16 by means of a bolt 18 is a live lever 19. This live lever 19 is operated by a brake cylinder (not shown). The live lever 19 is normally held against its stop 20 by means of a coil spring 21. This coil spring 21 is provided at one end with a loop 22 engaging the over-turned end 23 of the live lever, and, at the other, is secured to a bolt 24 which secures the live lever stop 20 in position. Pivoted between the lugs 17 by means of a bolt 26 is a dead lever 27. The lower ends of the live lever 19 and of the dead lever 27 are connected by means of a rigid rod 28. Connected to the pivoted point of the live lever 19 by means of its pivot 18 is one end of an adjustable connecting rod 29. This rod 29 is provided with ratchet teeth 30 and is surrounded by a sleeve 31 carrying a dog or detent 32 which engages with the ratchet teeth 30 on the rod 29. Extending upwardly from the sleeve 31 is a lug 33 provided with an elongated slot 34 through which passes one end of the bolt 26 forming the pivot of the dead lever 27. This bolt 26, as best shown in Fig. 6, is provided with a collar 35 which is interposed between the lug 33 and the adjacent lug 17 on the brake beam 15. This collar 35, together with shoulders 36 formed adjacent to the ends of the bolt 26 and adapted to limit the movement of the ends 37, prevents the clamping of the lug 33 to the lug 17 and thus insures the proper movement of the bolt 26 in the slot 34.

38 is a rocking member which is mounted upon the sleeve 31 and projects under the dog 32 at 39, as best shown in Fig. 5 of the drawings. The opposite end of the rocking member 38 is provided with a finger piece 40, by depressing which, the dog 32 may be raised out of engagement with the teeth 30 on the bar 29.

Pivoted to the bolster 11 by means of a bolt or pin 41 is the dead lever ratchet bar 42, shown in detail in Fig. 4. The dead lever ratchet bar 42 is provided with a stop 43 which is adapted to strike against the bolster 11, as shown in Fig. 1 of the drawings, and thus limit the downward movement of the ratchet bar on its pivot 41. The ratchet bar 42 is provided with a slot 44 through which passes the upper end of the dead lever 27. The dead lever 27 is provided with anti-friction rolls 45 for bearing upon the lower edge of the ratchet bar 42. Pivoted in the upper end of the dead lever 27 by means of a bolt 46 is a dog 47 for engaging with the teeth 48 of the ratchet of the ratchet bar 42. This dog 47 is straddled by yoke 49 secured to a coil spring 50 surrounding the pivot pin 46. Passing through the upper part of the yoke 49 is a set screw 51, by means of which the tension of the spring 50 may be properly adjusted so as to prevent the dog 47 from being disengaged from the teeth 48 by the jolting of the car, and at the same time, to allow of the said dog being readily disengaged from the teeth by means of an outwardly projecting tail piece 52 with which the dog is supplied for this purpose.

The operation of my device is as follows: When the live lever 19 is drawn away from its stop 20 by means of a brake cylinder (not shown), the lower ends of this lever and the dead lever 27 are maintained at a constant distance apart by means of a fixed connection 28, the brake beams 15 will thereby be separated causing the brake shoes 14 to be applied to the peripheries of the wheels 12. The pivot points of the levers 19 and 27 will thus be separated. In the normal operation of the brake, the amount of separation of these pivot points will be just equal to the length of the slot 34 in the lug 33 and the effective length of the rod 29, will, therefore, not be altered. When, however, owing to wear of the brake shoes or any other cause, the amount of movement becomes greater, the bolt 26 will come into contact with the end of the slot 34, thus moving the sleeve 31 along the rod 29 the distance of one or more of the teeth 30. The dog 32 will prevent the return of the sleeve 31 when the live lever assumes its normal position after the release of the brake and, consequently, upon the return movement of the brake beams 15, the bolt 26 will come into contact with the opposite ends of the slot 34, thus causing the upper end of the dead lever to move outwardly along the dead lever ratchet bar 42 and thus complete the operation of compensating for the slack in the brake. This operation will take place automatically as often as slack is caused either by the wear of the brake shoes or from any other cause. When it is desired to return the adjustable connection,—when supplying the brake with new shoes, the dog 32 is lifted out of engagement with the teeth 30 by pressure upon the finger piece 40 and, at the same time, the dog 47 is raised out of engagement with the teeth 48 by pressure on the tail piece 52. The parts will now be returned to their normal position, to again operate in the manner above described. By supplying the live lever 19 with a piston stop 20 for limiting its return movement, a uniform movement of the lever is insured, thus insuring the proper operation of the adjusting devices.

Having fully described my invention, what I claim as new and desire to secure by Letters Patent of the United States is:

1. In a slack adjuster for car brakes, the combination with a pair of brake beams, of a live lever pivoted to one side of said beams, a dead lever pivoted to the other of said beams, a rigid connection between the lower ends of said lever, an automatically adjustable connection between the pivoted points of said levers, a pivoted ratchet bar engaging with the upper end of said dead lever and coöperating with said adjustable connection to compensate for slack, and a stop for limiting the return movement of said pivoted ratchet bar in one direction.

2. In a slack adjuster for car brakes, the combination with a pair of brake beams, of a live lever pivoted to one of said beams, a dead lever pivoted to the other of said beams, a rigid connection between the lower ends of said lever, an automatically adjustable connection between the pivoted points of said levers, a ratchet bar, a dog carried by said dead lever and engaging with said ratchet bar, a spring for holding said dog in engagement with said bar, and means for adjusting the tension of said spring.

3. In a slack adjuster for car brakes, the combination with a pair of brake beams, of a live lever pivoted to one of said beams, a dead lever pivoted to the other of said beams, a rigid connection between the lower ends of said levers, an automatically adjustable connection between the pivoted points of said levers, a ratchet bar, a dog carried by said dead lever and engaging with said ratchet bar, said dog being provided with a tail piece for disengaging with said ratchet bar, a spring normally holding said dog in engagement with said ratchet bar, and means for adjusting the tension of said spring.

4. In a slack adjuster for car brakes, the combination with a pair of brake beams, of a live lever pivoted to one of said beams, a dead lever pivoted to the other of said beams, a rigid connection between the lower ends of said levers, an automatically adjustable connection between the pivoted points of said levers, a ratchet bar, a dog carried by said dead lever and engaging with said ratchet bar, said dog being provided with a tail piece for disengaging with said ratchet bar, a spring pressed yoke bearing on said dog, and a set screw carried by said yoke for adjusting the tension of the spring.

5. In a slack adjuster for railway cars, the combination with a pair of brake beams, of a live lever pivoted to one of said beams, a dead lever pivoted to the other of said beams, a rigid connection betwen the lower ends of said levers, a rod connected to the pivoted point of one of said levers and provided with ratchet teeth, a sleeve surrounding said rod and provided with a dog engaging with said teeth, and a slotted lug carried by said sleeve and engaging with the pivot bolt of the other of said levers, said pivot bolt having a collar adjacent to said lug to prevent binding of the lug.

6. In a slack adjuster for railway cars, the combination with a pair of brake beams, of a live lever pivoted to one of said beams, a dead lever pivoted to the other of said beams, a rigid connection between the lower ends of said levers, a rod connected to the pivot point of one of said levers and provided with ratchet teeth, a sleeve surrounding said rod and provided with a dog engaging with said teeth, and a rocking member extending longitudinally of said sleeve engaging with said dog for releasing the same from the teeth of said bar.

7. In a slack adjuster for railway cars, the combination with a pair of brake beams, of a live lever pivoted to one of said beams, a dead lever pivoted to the other of said beams, a rigid connection between the lower ends of said levers, a rod connected to the pivot point of one of said levers and provided with ratchet teeth, a sleeve surrounding said rod, a spring carried by said sleeve and engaging with the teeth of said rod, and a rocking member extending longitudinally of said sleeve and arranged between said sleeve and spring for releasing the latter.

In testimony whereof, I have hereunto set my hand and affixed my seal in the presence of the two subscribing witnesses.

LOUIS A. HOERR. [L. S.]

Witnesses:
W. A. ALEXANDER,
G. M. SHORE.

---

Copies of this patent may be obtained for five cents each, by addressing the "Commissioner of Patents, Washington, D. C."